United States Patent [19]
Faris et al.

[11] 3,832,728
[45] Aug. 27, 1974

[54] CAMERA ACCOMMODATING TWO SIZES OF FILM

[75] Inventors: Edwin E. Faris, Wyckoff; Charles J. Hertling, Bloomfield, both of N.J.

[73] Assignee: Berkey Photo, Inc., Paramus, N.J.

[22] Filed: July 3, 1972

[21] Appl. No.: 268,573

[52] U.S. Cl. .............................. 354/210, 354/174
[51] Int. Cl. ........................................ G03b 19/02
[58] Field of Search ..... 95/11 R, 19, 22, 13, 31 DS, 95/66; 354/159, 210, 174

[56] References Cited
UNITED STATES PATENTS
1,259,069   3/1918   Bardsley ............................ 354/174
1,447,972   3/1923   Faber ................................. 354/174

*Primary Examiner*—Samuel S. Matthews
*Assistant Examiner*—Kenneth C. Hutchison
*Attorney, Agent, or Firm*—Neuman, Williams, Anderson & Olson

[57] ABSTRACT

A camera is provided which is adapted to accommodate rectangular film packets or cartridges of two different sizes. The end wall dimension of each packet is substantially the same and the smaller packet is provided with unique exterior protuberances formed along the elongated sides thereof. The camera includes an opaque housing with a lens mounted on the front end thereof, and a film packet holder affixed to the interior of the housing and spaced rearwardly of the lens. The holder comprises a frame which delimits a rectangular area, the latter being in registered relation with the optical axis of the lens. The delimited rectangular area is adapted to accommodate either size packet. The sides of the frame, defining the elongated sides of the area, have formed therein recesses which are adapted to receive the exterior protuberances of the smaller size packet when the latter is accommodated in the holder. The relative location of the recesses on the frame insures proper positioning of the small size packet with respect to the optical axis of the lens. The spacing between the narrow sides of the rectangular area is such that the larger size packet will snugly fit therebetween.

5 Claims, 4 Drawing Figures

FIG. 2

PATENTED AUG 27 1974 3,832,728
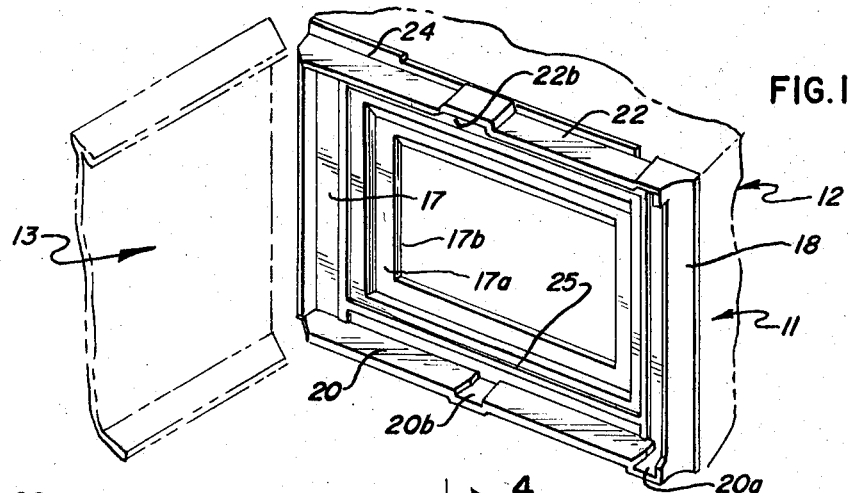
FIG. 1
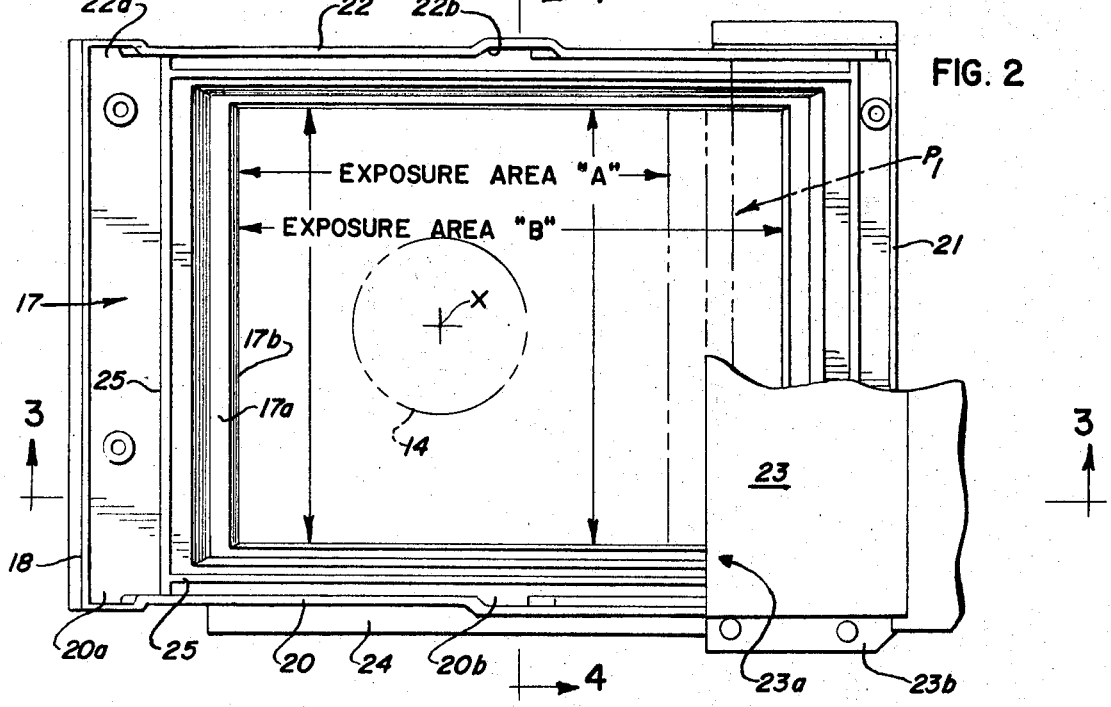
FIG. 2
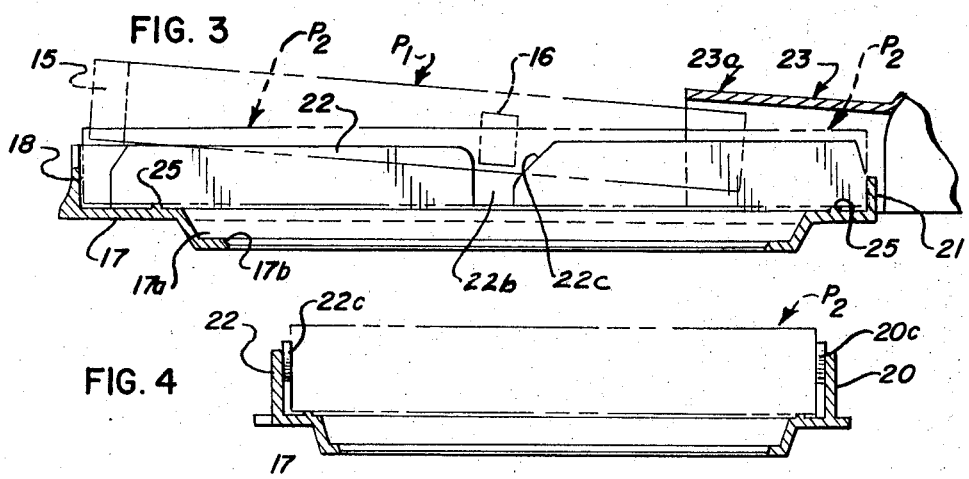
FIG. 3
FIG. 4

CAMERA ACCOMMODATING TWO SIZES OF FILM

BACKGROUND OF THE INVENTION

Various cameras utilizing self-developing film are presently available; however, such cameras are adapted to accommodate only one size film packet or cartridge. Thus, if a smaller or larger size film packet is to be used, a different camera is required. The shortcomings of the present cameras in this regard are readily apparent.

SUMMARY OF THE INVENTION

Thus, it is an object of this invention to provide a single camera which is capable of accommodating the various popular size packets of self-developing film presently available on the market.

It is a further object of this invention to provide a camera of the type described which is of simple, compact, and inexpensive construction.

It is a still further object of this invention to provide a camera capable of automatically accommodating various size film packets without first requiring various adapter pieces to be installed in the camera housing.

It is a still further object of this invention to provide a camera of the type described wherein the film loading and unloading procedure is the same for each size film packet.

It is a still further object of this invention to provide a camera of the type described which is provided with a fool-proof feature whereby the various size film packets will be automatically disposed in the correct position with respect to the lens optical axis when the packet is loaded in the camera.

Further and additional objects will appear from the description, accompanying drawing and appended claims.

In accordance with one embodiment of the invention, a camera is provided which is capable of accommodating film packets of at least two different rectangular sizes. Both size packets, however, have narrow sides which are of the same dimension. The smaller size packet, however, is provided with outwardly projecting protuberances formed along the elongated sides thereof. The camera includes an opaque housing having a lens mounted on the front end thereof. Disposed within the housing and spaced rearwardly of the lens is a film packet holder which delimits a rectangular area in registered relation with the optical axis of the lens. The housing is provided with an adjustable cover to permit loading and unloading of the holder. Conventional shutter means is provided on the housing for controlling the exposure of a predetermined portion of the film contained within the accommodated packet. Segments of the holder defining the elongated sides of the delimited rectangular area are provided with recesses. Each recess is adapted to receive a protuberance formed on the small size packet. The recess-accommodated protuberances restrain lateral movement of the loaded packet and assure that the packet is held in proper position with respect to the optical axis of the camera lens. The lengths of the elongated sides of the rectangular area formed by the holder substantially coincide with the length of the elongated sides of the larger packet; and, thus, cause the latter to be snugly accommodated by the holder.

For a more complete understanding of the invention, reference should be made to the drawing, wherein:

DESCRIPTION

FIG. 1 is a fragmentary perspective rear view of the film packet holder and showing the camera housing and cover therefor in phantom lines.

FIG. 2 is an enlarged rear elevational view of the holder of FIG. 1 and showing a light shield carried by the holder partially removed; the lens and one side of the exposure area of each film size and one side of the small size packet being shown in phantom lines.

FIG. 3 is a sectional view taken along line 3—3 of FIG. 2 and showing in a first set of phantom lines a small size packet being loaded into the holder, and showing in a second set of phantom lines a large size packet accommodated within the holder.

FIG. 4 is a sectional view taken along lines 4—4 of FIG. 2, but with the light shield removed.

Referring now to the drawing, a film packet holder 10, preferably of unitary construction, is shown which is fixedly mounted on the rear end of an opaque housing 11 of a camera 12. The illustrated camera is of a type which is adapted to receive packets or cartridges $P_1$ and $P_2$ of self-developing film. An opaque cover 13 is hingedly mounted on the rear end of the housing 11, and when in an open position, as shown, permits loading and unloading of the camera. Mounted on the front end of the housing 11 is a lens 14. Suitable shutter means, not shown, are provided on the housing adjacent the lens to control the exposure of a portion of the film by the passage of light rays through the lens. The lens, housing, cover, and various other control and focusing devices are of conventional design and are found on cameras of this general type and per se do not form a part of the invention.

Packets $P_1$ and $P_2$ of self-developing film are presently available in two sizes on the retail market. The small size packet film produces prints having a substantially square configuration of approximately 3 × 3 inches. The large size packet film, on the other hand, produces prints of rectangular configuration, approximately 3 × 3¾ inches. The packets containing the aforenoted film have outside dimensions which differ from one another to compensate for the difference in the size of the prints produced. The small and large size packets, $P_1$ and $P_2$, respectively, have the same outside width (approximately 3½ inches) and depth (approximately ¾ inch) dimensions, but differ from one another in the length dimension (approximately 4 7/16 inches for the small size $P_1$, and approximately 5¼ inches for the large size $P_2$). The two size packets, as presently available at retail, contain eight exposures. The front face of each size packet, that is the face disposed toward the camera lens when the packet is loaded in the camera, defines a frame which determines the area of the exposure of the film. In FIG. 2 there is shown exposure area A, which is the front face area of the small film packet $P_1$, and exposure area B is the front face area of the large film packet $P_2$.

Small film packet $P_1$, as seen in one set of phantom lines in FIG. 3, has pairs of outwardly projecting lugs 15 and 16 formed on two opposed sides thereof. Lugs 15 are disposed adjacent one corresponding end of the packet, and lugs 16 are spaced a predetermined distance from the opposite end of the packet. The lugs 15 and 16 cooperate with the holder 10 to properly position the packet when it is loaded in the holder, as will be described more fully hereinafter.

Holder 10, as aforementioned, is preferably of unitary construction and includes a base section 17 and peripheral flange sections 18, 20, 21 and 22, which cooperate with one another to delimit the base section. As seen in FIGS. 3 and 4, the base section has a recessed apertured central portion 17a which extends towards the lens end of the housing 11. A rectangular aperture 17b is formed in the recessed central portion 17a through which the light rays from the lens pass and expose the portion of the film framed by the front face of the film packet.

Flange sections 20 and 22 are in parallel relation and each is provided with a pair of recesses 20a and b, and 22a and b. Recesses 20a and 22a are opposite one another and are adapted to accommodate the lugs 15 formed on the exterior of small film packet $P_1$ when the latter is loaded in the holder 10. In a similar manner, recesses 20b and 22b are disposed in opposed relation and are adapted to accommodate lugs 16 of packet $P_1$. It will be noted in FIG. 3 that one side wall of each recess 20a or b, or 22a or b has the upper portion 20c or 22c thereof inclined so as to form an outwardly diverging open end. The inclined upper portion provides a camming surface for the packet lug 15 or 16 when the packet $P_1$ is being loaded into the holder 10. The size of the recesses 20a and b and 22a and b are such that a fairly snug fit results between the recess and the accommodated lug. Thus, once the lugs are disposed within the recesses, the accommodated packet will be retained in proper position relative to the lens optical axis X. Lateral or longitudinal shifting of the accommodated packet is prevented by the flange sections 20 and 22, and by the recess-accommodated lugs.

As aforementioned, the larger film packet $P_2$ presently available on the retail market does not have any exterior projections or lugs and, thus, is sized both in width and length so that the packet will snugly fit within the space delimited by the flange sections 18, 20, 21 and 22.

Mounted on the holder and disposed adjacent flange section 21 is an opaque light shield 23. The shield includes a top portion 23a which partially overlies and is spaced from the back side of the holder. The inner edge of the top portion, that is the edge closest to the optical axis X of the lens 14, is elevated relative to the outer edge, see FIG. 3. This elevation differential is to facilitate loading and unloading of the packet within the holder. The shield is provided with laterally extending side flanges 23b which are secured by suitable means to corresponding ledges 24 formed on the holder 10.

Thus, when loading either the small or large size film packet into holder 10, the same manual manipulation is followed; namely, one end of the packet is inserted under the top portion of the shield and then the opposite end of the packet is pushed inwardly so that said end will be disposed adjacent the interior surface of the flange section 18 and the packet will engage the base section 17 of the holder. In the preferred embodiment the base section 17 is provided with reinforcing ribs 25. When the packet is properly positioned within the holder, the back surface of the packet will rest against the ribs 25 as seen in FIG. 3.

The holder 10 is of simple construction and may be formed of suitable inexpensive plastic material and will not increase the overall size of the camera housing and cover, and will not increase the total weight of the camera itself. The size and shape of the holder may vary from that shown and will depend in certain respects upon the shape and size of the housing. The holder is permanently affixed to the interior of the housing; and, thus, does not require the need for separate adapters or the like to be used to compensate for the dimensional variations of the film packets.

We claim:

1. In a camera adapted to accommodate film packets of at least two different rectangular sizes with the corresponding shorter sides thereof having substantially the same dimension and the longer sides of the smaller packet being provided with exterior protuberances, the camera having an opaque housing with a lens mounted on the front end thereof and means rearwardly of the lens for loading and unloading individual film packets into the housing interior; a film packet holder fixedly mounted within the housing adjacent the loading and unloading means therefor, said holder comprising an apertured base section positioned in the housing generally parallel to the lens, the aperture in said base section providing means for exposing a portion of the accommodated film packet to the light rays passing through the lens, and first and second peripheral segments extending from said base section and delimiting a rectangular area separated from the lens by said apertured base section; said first peripheral segments defining the shorter sides of the delimited area and being substantially coextensive with the exterior dimension of the shorter side of an accommodated packet, said second peripheral segments defining the longer sides of said delimited area and being provided with recesses for removably receiving the exterior protuberances of an accommodated smaller size packet and cooperating with said second peripheral segments to restrain relative movement of the packet, the distance between said first peripheral segments being substantially the same as the length of the longer side of the larger size packet whereby the latter is adapted to occupy the area delimited by said first and second peripheral segments.

2. In the camera of claim 1 wherein the apertured base section of said holder is provided with a depressed central portion containing the aperture through which the lens light rays pass; said aperture being disposed in registered relation with the rectangular area delimited by said peripheral segments.

3. In the camera of claim 1 wherein each second peripheral segment of said holder is provided with a pair of longitudinally spaced recesses, a corresponding one recess of each second peripheral segment being disposed closer to the lens optical axis than the other corresponding recess.

4. In the camera of claim 3 wherein each recess has an open end and the portions of the side walls of said recess defining said open end being disposed in outwardly diverging relation whereby one of said side walls forms a camming surface engageable by an exterior protuberance when the smaller size packet is being loaded into the holder.

5. In the camera of claim 1 wherein said holder is of unitary construction.

* * * * *